United States Patent
Kung et al.

(10) Patent No.: US 9,401,660 B2
(45) Date of Patent: *Jul. 26, 2016

(54) MONOLITHIC AC/DC CONVERTER FOR GENERATING DC SUPPLY VOLTAGE

(71) Applicant: Power Integrations, Inc., San Jose, CA (US)

(72) Inventors: David Kung, Foster City, CA (US); Balu Balakrishnan, Saratoga, CA (US)

(73) Assignee: Power Integrations, Inc., San Jose, CA (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/157,786

(22) Filed: Jan. 17, 2014

(65) Prior Publication Data

US 2014/0140115 A1    May 22, 2014

Related U.S. Application Data

(63) Continuation of application No. 12/587,398, filed on Oct. 6, 2009, now Pat. No. 8,634,218.

(51) Int. Cl.
*H02M 7/219* (2006.01)
*H02M 7/217* (2006.01)

(52) U.S. Cl.
CPC ............... *H02M 7/219* (2013.01); *H02M 7/217* (2013.01); *H02M 7/2176* (2013.01); *H02M 2007/2195* (2013.01)

(58) Field of Classification Search
CPC ............. H02M 7/2176; H02M 7/219; H02M 2007/2195
See application file for complete search history.

(56) References Cited

U.S. PATENT DOCUMENTS

| 4,777,580 | A | * | 10/1988 | Bingham | ............ | H01L 27/0814 |
| | | | | | | 257/E27.051 |
| 4,866,585 | A | * | 9/1989 | Das | ........................ | H02M 7/219 |
| | | | | | | 363/127 |
| 5,282,107 | A | | 1/1994 | Balakrishnan | | |
| 5,285,369 | A | * | 2/1994 | Balakrishnan | .......... | H02M 1/36 |
| | | | | | | 323/901 |

(Continued)

FOREIGN PATENT DOCUMENTS

| CN | 1492509 | 4/2004 |
| JP | S56037683 | 9/1982 |
| JP | H07254718 | 10/1995 |

OTHER PUBLICATIONS

Popa et al, "Optimal Curvature-Compensated BiCMOS Bandgap Reference". Image and Signal Processing and Analysis, 2001, pp. 507-510, Fig. 2.

*Primary Examiner* — Fred E Finch, III
(74) *Attorney, Agent, or Firm* — The Law Offices of Bradley J. Bereznak

(57) ABSTRACT

An integrated circuit (IC) comprises a rectifier/regulator circuit coupled to receive an ac source voltage and output a regulated dc voltage. The rectifier/regulator circuit includes first and second switching elements that provide charging current when enabled. The first and second switching elements do not provide charging current when disabled. A sensor circuit is coupled to sense the regulated dc voltage and generate a feedback control signal coupled to the rectifier/regulator circuit that enables the first and second switching elements when the regulated do voltage is above a target voltage, and disables the first and second switching elements when the regulated do voltage is below the target voltage.

14 Claims, 3 Drawing Sheets

(56) References Cited

U.S. PATENT DOCUMENTS

| | | | | |
|---|---|---|---|---|
| 5,510,972 A * | 4/1996 | Wong | ..................... | H02M 7/219 363/125 |
| 5,850,337 A | 12/1998 | Lee | | |
| 5,969,566 A | 10/1999 | Weber et al. | | |
| 6,055,171 A * | 4/2000 | Ishii | .................... | H02M 1/4208 363/84 |
| 6,157,049 A * | 12/2000 | Mitlehner | ............. | H01L 27/085 257/124 |
| 6,366,485 B1 * | 4/2002 | Fujisawa | ................ | G04C 10/00 363/127 |
| 6,549,438 B2 * | 4/2003 | Malone | ................ | H02M 7/217 363/127 |
| 6,828,631 B2 * | 12/2004 | Rumennik | ......... | H01L 29/0619 257/262 |
| 7,760,524 B2 | 7/2010 | Matthews | | |
| 8,300,440 B2 * | 10/2012 | Ho | ....................... | H02M 7/217 363/127 |
| 8,634,218 B2 * | 1/2014 | Kung | ..................... | H02M 7/12 363/127 |
| 2003/0201821 A1 | 10/2003 | Coady | | |
| 2004/0041622 A1 | 3/2004 | Wu | | |
| 2004/0190316 A1 * | 9/2004 | Minks | ................... | H02M 7/219 363/127 |
| 2005/0035371 A1 | 2/2005 | Fujihira | | |
| 2007/0035286 A1 | 2/2007 | Lee et al. | | |
| 2007/0211504 A1 * | 9/2007 | Unkrich | ................ | H02M 7/064 363/89 |
| 2008/0291699 A1 * | 11/2008 | Sells | ..................... | H02M 7/219 363/17 |
| 2009/0016090 A1 * | 1/2009 | Knight | ............. | H02M 3/33592 363/127 |
| 2009/0261790 A1 * | 10/2009 | Arduini | ............ | H02M 3/33592 323/266 |
| 2010/0188876 A1 * | 7/2010 | Garrity | ............... | H02M 1/4225 363/127 |
| 2012/0028083 A1 | 2/2012 | Jung | | |

* cited by examiner

MONOLITHIC AC/DC CONVERTER FOR GENERATING DC SUPPLY VOLTAGE

This application is a continuation of application Ser. No. 12/587,398, filed Oct. 6, 2009, now U.S. Pat. No. 8,634,218, which is assigned to the assignee of the present application.

TECHNICAL FIELD

The present disclosure generally relates to the field of integrated circuits, and more particularly to an integrated circuit for generating a regulated dc supply voltage from an ac line voltage.

BACKGROUND

An integrated circuit typically requires a regulated dc supply voltage for operation. This regulated dc supply voltage is typically derived from an ac line voltage via external circuit components arranged to implement a discrete rectifier. Existing rectifier circuits such as half-bridge or full-bridge rectifier circuits are usually implemented with discrete diodes. A separate stage of regulation circuitry typically includes discrete components, such as a capacitor, to provide regulation to the dc voltage received from the rectifier. The use of discrete components increase material costs and require additional space on a printed circuit board (PCB) to provide the regulated dc supply voltage for an integrated circuit.

BRIEF DESCRIPTION OF THE DRAWINGS

The present invention is illustrated by way of example, and not limitation, in the figures of the accompanying drawings, wherein.

DESCRIPTION OF EXAMPLE EMBODIMENTS

In the following description specific details are set forth, such as material types, voltages, component values, configurations, etc., in order to provide a thorough understanding of the present invention. However, persons having ordinary skill in the relevant arts will appreciate that these specific details may not be needed to practice the embodiments described.

It should be understood that the elements in the figures are representational, and are not drawn to scale in the interest of clarity. It is also appreciated that although an IC utilizing N-channel field-effect transistor devices is disclosed, P-channel transistors may also be utilized in alternative embodiments. In still other embodiments, some or all of the metal-oxide-semiconductor field-effect transistor (MOSFET) devices show by way of example may be replaced with bipolar junction transistors (BJTs), insulated gate field effect transistor (IGFETs), or other device structures that provide an active switching function. Furthermore, those with skill in the art with integrated circuits and power converter devices will understand that transistor devices such as those shown by way of example in the figures may be integrated with other transistor device structures, or otherwise fabricated or configured in a manner such that different devices share common connections and semiconductor regions (e.g., N-well, substrate, etc.).

In the context of the present application, when a transistor is in an "off state" or "off" the transistor is unable to conduct current. Conversely, when a transistor is in an "on state" or "on" the transistor is able to conduct current. In one embodiment, a high-voltage transistor comprises an N-channel metal-oxide-semiconductor field-effect transistor (MOSFET) with the high-voltage being supported between the first terminal, a source, and the second terminal, a drain.

For purposes of this disclosure, "ground" or "ground potential" refers to a reference voltage or potential against which all other voltages or potentials of a circuit or IC are defined or measured.

Figure 1:
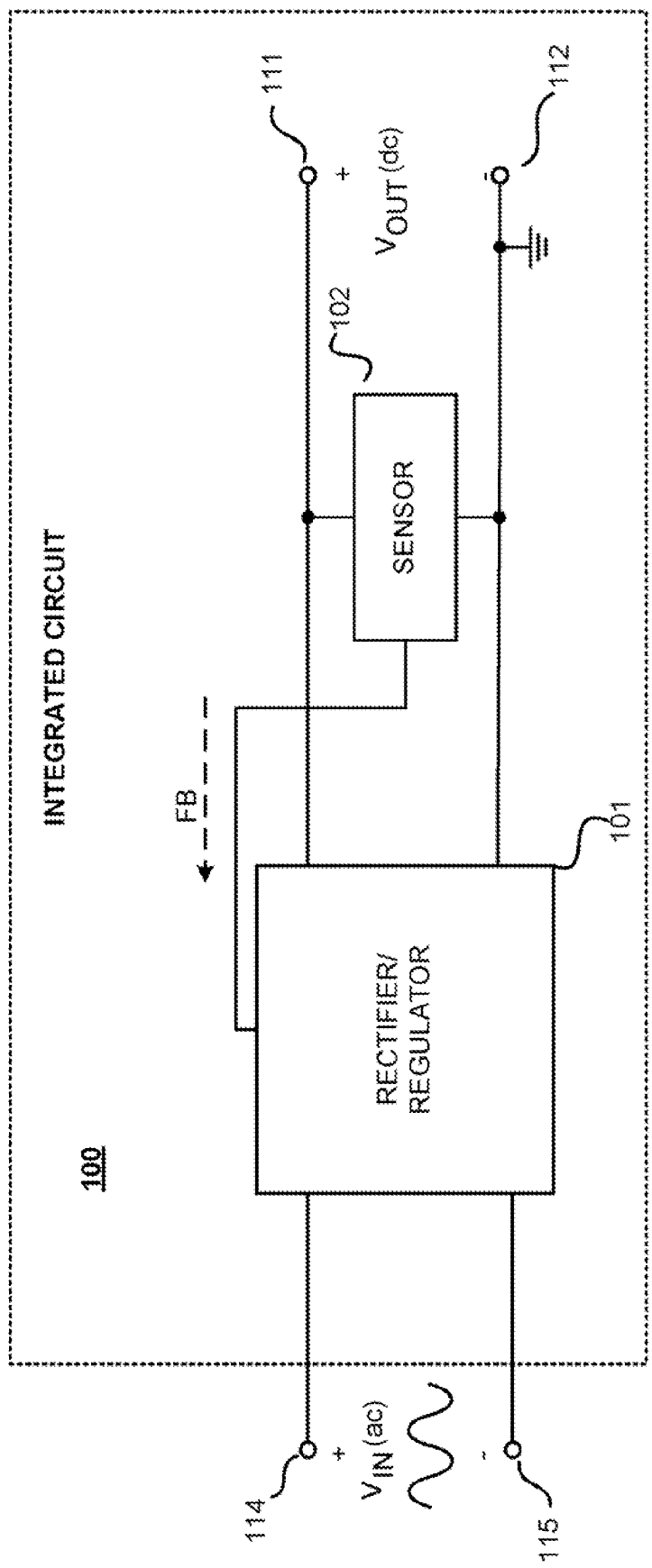
FIG. 1 illustrates an example block diagram of a monolithic ac/dc power converter for generating a dc power supply voltage on an integrated circuit (IC).

FIG. 1 illustrates an example block diagram of an ac/dc power converter for generating a dc power supply voltage on an integrated circuit (IC) 100. As shown, IC 100 includes a rectifier/regulator circuit 101 coupled to receive an externally-generated ac input voltage, $V_{IN}$, applied across input terminals or pins 114 & 115. In one example, input voltage, $V_{IN}$, may be an ordinary ac line voltage (e.g., 85 V ac-265 V ac; 50-60 Hz). In another example, IC 100 may be implemented in a three phase system. In another example, IC 100 may be a monolithic IC. As shown, rectifier/regulator 101 functions to provide rectification to the ac input voltage $V_{IN}$ and regulate an output voltage $V_{OUT}$ across terminals 111 and 112. Stated differently, the ac input voltage $V_{IN}$ is converted to a dc output voltage $V_{OUT}$, such that the polarity of the output signal remains unchanged (positive).

As shown, sensor circuit 102 is coupled between terminals 111 and 112 to receive the dc voltage output from rectifier/regulator circuit 101 and to output a feedback signal FB in response to dc output voltage $V_{OUT}$ provided across output terminals 111 and 112. By way of example, regulated dc voltage $V_{OUT}$ may be configured as a supply voltage of a low voltage (e.g., 5 V) at terminal 111 with respect to terminal 112 at ground (0 V). It is appreciated that the output voltage $V_{OUT}$, produced across output nodes 111 and 112, may be used as a supply voltage for operation of circuitry internal to IC 100. In another example, output voltage $V_{OUT}$ may be used for operation of circuitry external to IC 100.

Figure 2:
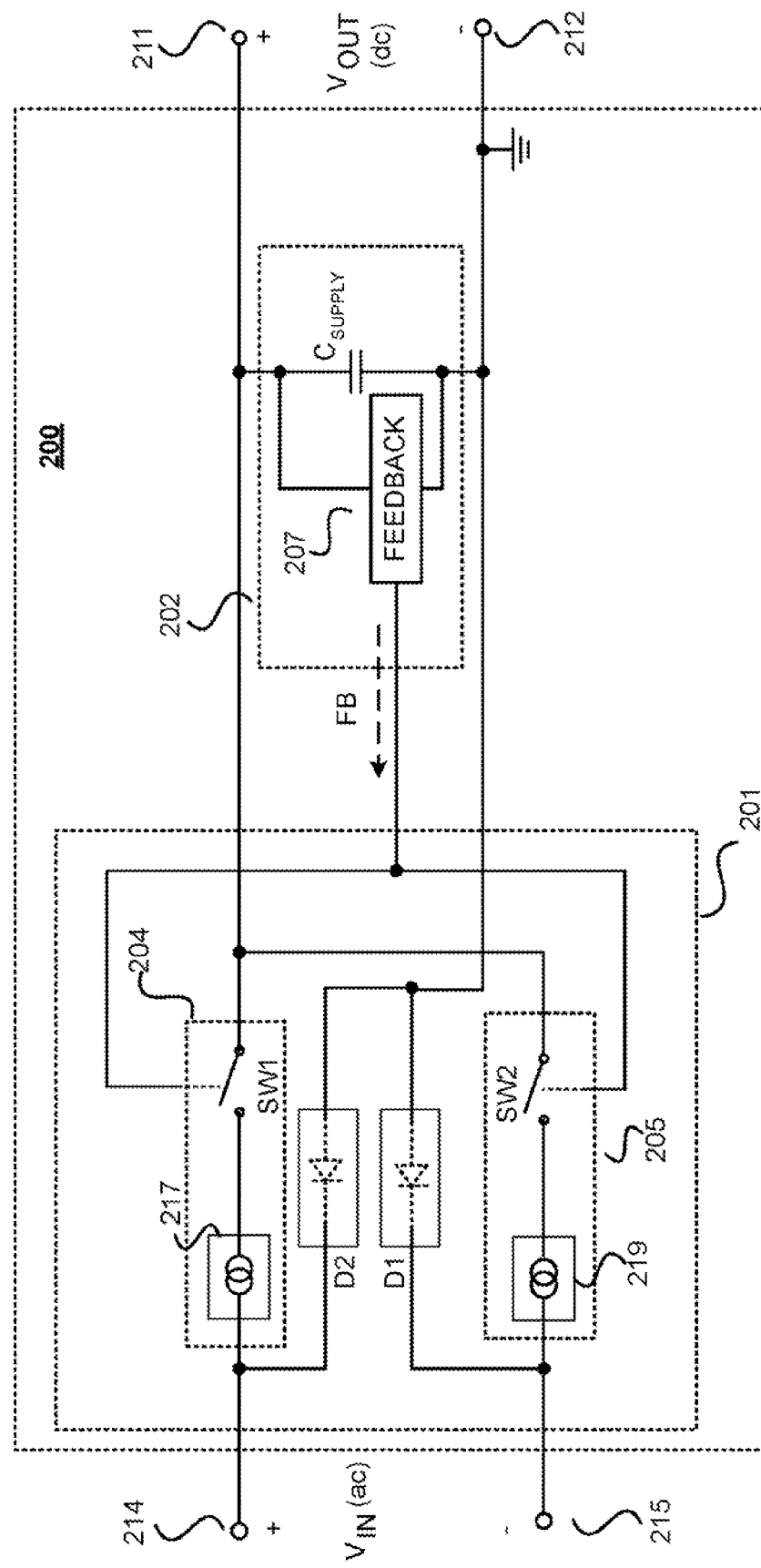
FIG. 2 illustrates an example conceptual circuit schematic diagram of the monolithic ac/dc power converter circuit shown in FIG. 1.

FIG. 2 illustrates an example conceptual circuit schematic diagram of an ac/dc power converter for generating a regulated dc output voltage $V_{OUT}$ in an integrated circuit 200. As shown, integrated circuit 200 includes rectifier/regulator 201 and sensor 202 which are possible implementations of rectifier/regulator 101 and sensor 102 respectively, of power converter 100 of FIG. 1. In this example, rectifier/regulator 201 is shown comprising switching elements 204 and 205, each having one connection end or side respectively connected to terminals 214 and 215. As shown, switching elements 204 and 205 comprise first and second current sources 217 and 219 are coupled to receive input voltage $V_{IN}$ from input terminals 214 and 215, respectively. As further shown, switching elements 204 and 205 further include switches SW1 and SW2 that are coupled to current sources 217 and 219, respectively.

In one embodiment, current sources 217 and 219 are constant current sources that selectively provide a constant charge current in response to the polarity of the input voltage $V_{IN}$. For example, current source 217 may provide a constant charge current when the input voltage $V_{IN}$ is at a higher potential at terminal 214 with respect to terminal 215. Similarly, current source 219 may provide a constant charge current when input voltage $V_{IN}$ is at a higher potential at terminal 215 with respect to terminal 214. In another embodiment, the magnitude of charge current generated by current sources 217 and 219 may be dependent on input voltage V.

Switches SW1 and SW2 are controlled by feedback signal FB. In operation, switching element 204 provides a constant charge current to capacitor $C_{SUPPLY}$ when SW1 is on and current source 217 is providing charge current. Switch SW1 restricts the flow of charge current from current source 217 in response to feedback signal FB. Similarly, switching element 205 provides a constant charge current to capacitor $C_{SUPPLY}$ when SW2 is on and current source 219 is providing charge. Switch SW2 restricts the flow of charge current from current source 219 in response to feedback signal FB. In one embodiment, based on the polarity of the input voltage $V_{IN}$, feedback signal FB may be split into two independent signals independently controlling switches 204 and 205.

Rectifier/regulator circuit 201 also includes diode elements D1 and D2 which have their cathodes respectively connected to input terminals 215 and 214. The anodes of diodes D1 & D2 are commonly connected to ground at node 212. In one example, diode elements D1 and D2 are body diodes of the substrate material of integrated circuit 200. In operation, diode elements D1 and D2 are coupled to provide a complete return path for charge current flowing through supply capacitor $C_{SUPPLY}$. Supply capacitor $C_{SUPPLY}$ is shown coupled between output nodes or terminals 211 and 212 to provide a regulated output voltage $V_{OUT}$ (dc).

Persons of ordinary skill in the art will understand that when either diode elements D1 or D2 is conducting, the current flowing through D1 or D2 is a substrate current consisting of minority carriers. To prevent this substrate current from adversely affecting other circuits on IC 100, ordinary double guard rails may be utilized in the layout of IC 100 to confine or attenuate the substrate current. For example, in one embodiment where IC 100 is fabricated with a P-type substrate, N+/N--well and P+ double guard rails may be formed around the diode elements D1 and D2. The double guard rails may be of a type ordinarily used in electrostatic discharge (ESD) protection circuitry. It is appreciated that the size or area used to implement the double guard rails may vary in different embodiments, depending on the level of confinement or attenuation required. In general, a larger double guard rail area provides a higher level of confinement/attenuation.

Continuing with the example of FIG. 2, a feedback circuit 207 is shown coupled across supply capacitor $C_{SUPPLY}$. In operation, feedback circuit 207 outputs a feedback signal FB in response to sensing the output voltage $V_{OUT}$. Feedback signal FB is coupled to either open or close switches SW1 and SW2. For example, during the first phase of input voltage $V_{IN}$, when switches SW1 and SW2 are closed and the voltage at input terminal 214 is high with respect to the voltage at terminal 215, current source 217 is on and a charging current is output to supply capacitor $C_{SUPPLY}$. In this case, the charging current flows in a path through supply capacitor $C_{SUPPLY}$ and back to terminal 215 through diode element D1, thereby charging supply capacitor $C_{SUPPLY}$.

Similarly, during the second phase of the input voltage $V_{IN}$, when switches SW1 and SW2 are closed and the voltage at input terminal 215 is high with respect to the voltage at terminal 214, current source 219 is on and a charging current is again output to supply capacitor $C_{SUPPLY}$. In this case, the charging current flows in a path through supply capacitor $C_{SUPPLY}$ and back to terminal 214 through diode element D2, thereby charging supply capacitor $C_{SUPPLY}$.

When the output voltage $V_{OUT}$ is at or above the target, regulated value (e.g. 5 V feedback element 207 outputs a feedback signal FB to turn off (open) switches SW1 and SW2, which prevents further charging of supply capacitor $C_{SUPPLY}$ from occurring. When the voltage potential at node 211 drops below the target, regulated value, feedback element 207 outputs a feedback signal FB to turn on (close) switches SW1 and SW2, thus resuming the charging of supply capacitor $C_{SUPPLY}$. Operation of the circuitry shown in the example of FIG. 2 may continue in this manner as long as IC 200 remains powered on.

Figure 3:
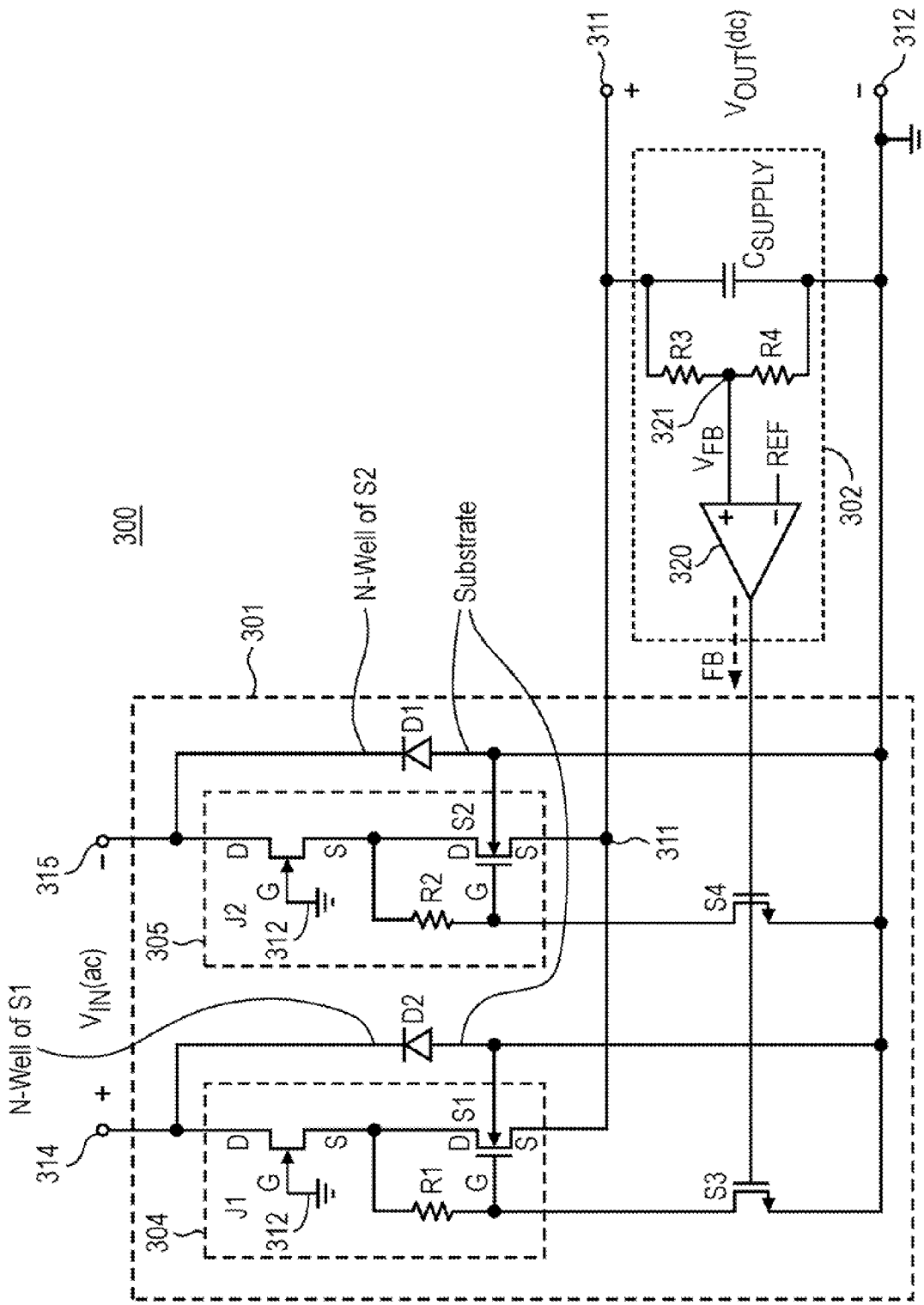
FIG. 3 illustrates an example detailed circuit schematic diagram of the monolithic ac/dc power converter circuit shown in FIGS. 1 & 2.

FIG. 3 illustrates an example detailed circuit schematic diagram of an integrated ac/dc power converter circuit 300. Integrated circuit 300 is one possible implementation of IC 100 of FIG. 1 and IC 200 of FIG. 2. As shown, IC 300 includes a rectifier/regulator circuit 301 and sensor circuit 302. In the embodiment of FIG. 3 switching elements 304 and 305 of rectifier/regulator 301 are each shown being implemented by a junction field effect transistor (JFET) connected to a resistor and an n-channel metal oxide semiconductor field effect transistor (MOSFET). For example, switching element 304 may comprise an N-JFET J1 having a first terminal D (drain) coupled to input terminal 314, a second terminal G (gate) coupled to ground node 312, and a third terminal S (source) coupled to a first end of resistor R1 and the drain of MOSFET S1. A second end of resistor R1 is coupled to the gate G of MOSFET S1. The source S of MOSFET S1 is coupled to node 311. Likewise, switching element 305 comprises an N-JFET J2 having a first terminal D (drain) coupled to input terminal 115, a second terminal G (gate) grounded, and a third terminal S (source) coupled to the drain of MOSFET S2, Resistor R2 is shown coupled between the gate and drain of MOSFET S2. The source of MOSFET S2 is coupled to node 311.

Diode elements D1 and D2 are shown having both their anodes connected to ground node 312 and their cathodes respectively connected to input terminals 315 and 314. In one embodiment, diode elements D1 and D2 are implemented as parasitic substrate diodes; that is, a P-type substrate of IC 300 is the anode of both D1 and D2, with the cathode of each diode element D1 and D2 comprising the N-type drain region of the associated JFET, J2 and J1 respectively. In other words, diode element D1 is a pn junction comprising a P-type substrate of IC 300 and an N-type drain region of JFET J2. Likewise, diode element D2 is a pn junction comprising a P-type substrate of IC 300 and an N-type drain region of JFET J1. As described above in connection with the example of FIG. 2, double guard rails comprising N+N−well and P+ regions may be formed around each of JFETs J1 and J2 in the layout of IC 300 to confine or attenuate the substrate current that flows through diode elements D1 and D2.

In the example of FIG. 3, each of the JFETs J1 and J2 may be integrated with its associated MOSFET, In other words, switching elements 304 and 305 may each be implemented by a single integrated device structure which comprises two transistor elements that share a common N-type well region. In one embodiment, switching element 304 may be able to withstand greater than 1000 V across the drain D of J1 and the source S of S1, Similarly, switching element 305 may be able to withstand greater than 1000 V across the drain D of J2 and the source S of S2. In another example, JFETs J1 and J2 may be part of a separate high voltage circuit and/or device that performs a different function on IC 300.

In the embodiment of FIG. 3, voltage sensor circuit 302 comprises a supply capacitor $C_{SUPPLY}$ connected across output terminals 311 and 312. Voltage sensor circuit 302 further comprises a comparator 320 configured with the negative input coupled to a voltage reference, $V_{REF}$, and the positive input connected to a node 321. Node 321 provides a feedback voltage $V_{FB}$ with respect to ground terminal 312, In the example shown, feedback voltage $V_{FB}$ is representative of regulated output voltage $V_{OUT}$ and is generated from a resistor divider network comprising resistors R3 and R4 coupled in series across output terminals 311 and 312. In operation, the output signal, FB, generated by comparator 320 drives the gates of n-channel MOSFETs S3 & S4. The sources of MOSFETs S3 & S4 are coupled to ground terminal 312. The drains of MOSFETs S3 & S4 are respectively connected to the gates of MOSFETs S1 & S2. In one embodiment, MOSFETs S3 and S4 are level shifters that control the voltage at the gates of MOSFETs S1 & S2, thereby allowing switches S1 and S2 to turn on and off.

In operation, voltage sensor 302 operates by comparing the voltage $V_{FB}$ appearing at node 321 against reference voltage $V_{REF}$. In one embodiment, the value of resistors R3 and R4 are selected in order to regulate output voltage $V_{OUT}$ at a desired target value. When the voltage at node 321 exceeds the voltage reference $V_{REF}$, thus indicating that output voltage $V_{OUT}$ has exceeded its target, regulated value, comparator 320 switches MOSFETs S3 and S4 on, which turn MOSFETs S1 and S2 off, thereby disabling switching elements 304 and 305. Conversely, when the voltage $V_{FB}$ at node 321 drops below $V_{REF}$, due to output voltage $V_{OUT}$ dropping below its target, regulated value, the output of comparator 320 drops low, causing MOSFETs S3 & S4 to turn off. When both MOSFETs S3 & S4 are in an off state, switching element 304 or switching element 305 conducts charge current, depending on the polarity of the input ac voltage $V_{IN}$.

When the voltage potential at terminal 314 is high with respect to terminal 315, switch 304 is conducting and switch 305 is not conducting, and supply capacitor $C_{SUPPLY}$ is charged by the current flowing from terminal 314 through JFET J1, MOSFET S1, and supply capacitor $C_{SUPPLY}$, and back through diode D1 to terminal 315. On the other hand, when the voltage potential at node 315 is high with respect to node 314, switch 304 is not conducting, switch 305 is conducting, and supply capacitor $C_{SUPPLY}$ is charged by the current flowing from terminal 315 through JFET J2, MOSFET S2, and supply capacitor $C_{SUPPLY}$, and back through diode D2 to terminal 314.

Although the present invention has been described in conjunction with specific embodiments, those of ordinary skill in the arts will appreciate that numerous modifications and alterations are well within the scope of the present invention. Accordingly, the specification and drawings are to be regarded in an illustrative rather than a restrictive sense.

We claim:

1. An integrated circuit (IC) comprising:
   a regulator circuit coupled to, receive an ac source line voltage of between 85 to 265 V AC across first and second input terminals and output a regulated do supply voltage across first and a second output terminals, the regulator circuit including first and second high-voltage switching elements that selectively provide charging current when enabled, the first and second high-voltage switching elements capable of supporting a voltage difference between the ac line voltage and the regulated do supply voltage, the first high-voltage switching element including:
       a first MOSFET coupled between the first input terminal and the first output terminal and
       a first junction field-effect transistor (JFET) coupled between the first input terminal and a drain of the first MOSFET;
   and further wherein the second high-voltage switching element includes:
       a second MOSFET coupled between the second input terminal and the first output terminal; and
       a second JFET coupled between the second input terminal and a drain of the second MOSFET;
   a sensor circuit coupled to sense the regulated do supply voltage and generate a feedback signal to control the first and second high-voltage switching elements, wherein the feedback signal turns off the first and second high-voltage switching elements when the regulated do voltage is above a target voltage, and turns on the first and second high-voltage switching elements when the regulated dc voltage is below the target voltage, the sensor circuit further including a supply capacitor coupled between the first and second output terminals; and
   first and second body diodes each having an anode coupled to the second output terminal, a cathode of the first body diode being coupled to the second input terminal and the cathode of the second body diode being coupled to the first input terminal, the cathode of the first body diode comprising a common well region shared by the second MOSFET and second JFET, the cathode of the second body diode comprising a common well region shared by the first MOSFET and first JFET, a charging current of the supply capacitor alternately flowing through the first body diode when the first high-voltage switching element is turned on and through the second body diode when the second high-voltage switching element is turned on.

2. The IC of claim 1 wherein the first and second switching elements are respectively coupled to the first and second input terminals.

3. The IC of claim 1 wherein the sensor circuit further includes:
   a voltage divider coupled between the first and second output terminals, the voltage divider generating a feedback input voltage from the regulated dc voltage; and
   a comparator that generates the feedback signal by comparing the feedback input voltage to a reference voltage.

4. The IC of claim 1 wherein the regulated dc supply voltage is a 5V dc supply voltage.

5. An integrated circuit (IC) comprising:
   a regulator circuit coupled to receive an ac voltage and output a regulated dc supply voltage, the regulator circuit including:
       first and second high-voltage switching elements that when enabled selectively provide charging current to a supply capacitor across the regulated dc supply voltage, the first and second high-voltage switching elements being respectively coupled to first and second input terminals;
       first and second substrate diodes each having an anode coupled to a reference node, a cathode of the first substrate diode being coupled to the first input terminal and a cathode of the second substrate diode being coupled to the second input terminal, a charging current of the supply capacitor alternately flowing through the first and second substrate diodes when the first and second transistors are enabled; and
   a sensor circuit coupled to sense the regulated dc supply voltage and generate a feedback control signal therefrom, the feedback control signal being coupled to enable the first and second high-voltage switching elements to conduct current when the regulated dc supply voltage is below a target voltage, and to disable the first and second high-voltage switching elements from conducting current when the regulated dc supply voltage is above the target voltage,
   wherein the first high-voltage switching element is conducting when a potential difference between the first and second input terminals is positive and the first high-voltage switching element is enabled, the first switching element not conducting when the potential difference is negative and the first high-voltage switching element is enabled, the second high-voltage switching element conducting when the potential difference is negative and the second high-voltage switching element is enabled, the second high-voltage switching element not conducting when the potential difference between the first and second input terminals is positive and the second high-voltage switching element is enabled.

6. The IC of claim 5 wherein the IC is a monolithic power IC.

7. The IC of claim 5 wherein the first and second high-voltage switching elements are respectively coupled to the first and second input terminals, the first and second input terminals being coupled to receive the ac line voltage.

8. The IC of claim 5 wherein the sensor circuit includes the supply capacitor coupled to the regulator circuit and the regulated dc supply voltage being generated across the supply capacitor.

9. The IC of claim 8 wherein the sensor circuit further includes a feedback circuit that regulates charging of the supply capacitor to maintain the regulated dc supply output voltage.

10. An integrated circuit (IC) for generating a regulated do supply voltage at a supply node from an ac input voltage comprising:
    a regulator circuit coupled to receive the ac input voltage across first and second input terminals, the regulator circuit including:
        a first high-voltage switching element which includes a first transistor coupled between the first input terminal and the supply node;
        a second high-voltage switching element which includes a second transistor coupled between the second input terminal and the supply node; and
    a sensor circuit coupled between the supply node and a reference node, the sensor circuit being operable to sense the regulated dc supply voltage at the supply node and generate a feedback signal therefrom, the feedback signal being coupled to control the first and second high-voltage switching elements;
    wherein the feedback signal disables the first and second high-voltage switching elements from providing charging current to the supply node when the regulated dc supply voltage is above a target voltage, and enables the first and second high-voltage switching elements to provide charging current to the supply node when the regulated dc supply voltage is below the target voltage, and wherein the first high-voltage switching element is conducting when a potential difference between the first and second input terminals is positive and the first high-voltage switching element is enabled, the first high-voltage switching element is not conducting when a potential difference between the first and second input terminals is negative and the first high-voltage switching element is enabled, the second high-voltage switching element is conducting when a potential difference between the first and second input terminals is negative and the second high-voltage switching element is enabled, the second high-voltage switching element is not conducting when a potential difference between the first and second input terminals is positive and the second high-voltage switching element is enabled, and
    wherein the regulator circuit further includes first and second substrate diodes each having an anode coupled to the reference node, a cathode of the first substrate diode being coupled to the first input terminal and a cathode of the second substrate diode being coupled to the second input terminal, the charging current alternately flowing through the first and second substrate diodes when the first and second transistors are enabled.

11. The IC of claim 10 wherein the first high-voltage switching element further includes a junction field-effect transistor (JFET) coupled between the first input terminal and a drain of the first transistor, the second high-voltage switching element further including a second JFET coupled between the second input terminal and a drain of the second transistor.

12. The IC of claim 11 wherein the anode of the first and second substrate diodes comprises a P-type substrate of the power IC, the cathode of the first substrate diode comprising a N-type well region of the first transistor, the cathode of the second substrate diode comprising a N-type well region of the second transistor.

13. The IC of claim 10 wherein the sensor circuit further includes a supply capacitor coupled between the supply node and the reference node.

14. The IC of claim 10 wherein the sensor circuit further includes:
    a voltage divider coupled between the supply node and the reference node, the voltage divider generating a feedback voltage from the regulated dc supply voltage; and
    a comparator that generates the feedback signal by comparing the feedback voltage to a reference voltage.

* * * * *